(12) United States Patent
Chae

(10) Patent No.: US 11,531,881 B2
(45) Date of Patent: Dec. 20, 2022

(54) ARTIFICIAL INTELLIGENCE APPARATUS FOR CONTROLLING AUTO STOP SYSTEM BASED ON DRIVING INFORMATION AND METHOD FOR THE SAME

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 726 days.

(21) Appl. No.: 16/486,304

(22) PCT Filed: Mar. 11, 2019

(86) PCT No.: PCT/KR2019/002788
§ 371 (c)(1),
(2) Date: Aug. 15, 2019

(87) PCT Pub. No.: WO2020/184746
PCT Pub. Date: Sep. 17, 2020

(65) Prior Publication Data
US 2021/0365769 A1 Nov. 25, 2021

(51) Int. Cl.
*G06N 3/08* (2006.01)
*B60W 30/18* (2012.01)
(Continued)

(52) U.S. Cl.
CPC ............. *G06N 3/08* (2013.01); *B60W 30/181* (2013.01); *B60W 40/105* (2013.01);
(Continued)

(58) Field of Classification Search
CPC .......... G06N 3/08; G06N 3/0454; G06N 5/04; G06N 20/00; B60W 40/105;
(Continued)

(56) References Cited

U.S. PATENT DOCUMENTS 10,458,382 B2 * 10/2019 Miller ................. F02N 11/0818
11,053,873 B2 * 7/2021 Meroux ............... G06N 3/0454
(Continued)

FOREIGN PATENT DOCUMENTS

| KR | 1020150006744 | 1/2015 |
| KR | 101576371 | 12/2015 |
| KR | 101628399 | 6/2016 |

OTHER PUBLICATIONS

PCT International Application No. PCT/KR2019/002788, Written Opinion of the International Searching Authority dated Dec. 12, 2019, 9 pages.

*Primary Examiner* — Marthe Y Marc-Coleman
(74) *Attorney, Agent, or Firm* — Lee, Hong, Degerman, Kang & Waimey PC

(57) ABSTRACT

An embodiment of the present invention provides an artificial intelligence apparatus for controlling an auto stop function, including: an input unit configured to receive brake information and velocity information of a vehicle; a storage unit configured to store a control model for the auto stop function; and a processor configured to: acquire driving information comprising the brake information and the velocity information through at the input unit, acquire base data used for determining a control of the auto stop function from the driving information, determine a control mode for the auto stop function by using the base data and the control model for the auto stop function, and control the auto stop function according to the determined control mode, wherein the control mode is one of an activation mode which activates the auto stop function or a deactivation mode which deactivates the auto stop function.

14 Claims, 8 Drawing Sheets

(51) Int. Cl.
*B60W 40/105* (2012.01)
*G06K 9/62* (2022.01)
*G06N 3/04* (2006.01)
*G06N 5/04* (2006.01)

(52) U.S. Cl.
CPC ......... *G06K 9/6218* (2013.01); *G06K 9/6232* (2013.01); *G06K 9/6256* (2013.01); *G06K 9/6298* (2013.01); *G06N 3/0454* (2013.01); *G06N 5/04* (2013.01); *B60W 2520/04* (2013.01); *B60W 2540/12* (2013.01)

(58) Field of Classification Search
CPC ......... B60W 2520/04; B60W 2540/12; B60W 2520/10; B60W 2520/105; G06K 9/628; G06K 9/6232; G06K 9/6298; G06V 10/82
See application file for complete search history.

(56) References Cited

U.S. PATENT DOCUMENTS

| | | |
|---|---|---|
| 2013/0035839 A1 | 2/2013 | Otanez et al. |
| 2013/0124066 A1 | 5/2013 | Pebley et al. |
| 2015/0019114 A1 | 1/2015 | Jang |
| 2015/0175150 A1 | 6/2015 | Zhao et al. |
| 2015/0361910 A1 | 12/2015 | Ko et al. |

* cited by examiner

ARTIFICIAL INTELLIGENCE APPARATUS FOR CONTROLLING AUTO STOP SYSTEM BASED ON DRIVING INFORMATION AND METHOD FOR THE SAME

CROSS-REFERENCE TO RELATED APPLICATIONS

This application is the National Stage filing under 35 U.S.C. 371 of International Application No. PCT/KR2019/002788, filed on Mar. 11, 2019, the contents of which are hereby incorporated by reference herein in its entirety.

TECHNICAL FIELD

The present invention relates to an artificial intelligence apparatus and a method for the same. Particularly, the present invention relates to an artificial intelligence apparatus and method for determining whether an auto stop system mounted on a vehicle is activated based on driving information to control the auto stop system.

BACKGROUND ART

An auto stop system or an idle stop & go system is a system mounted on a vehicle, which stops an engine when the vehicle is stopped.

In the case in which the auto stop system is mounted on the vehicle, there is an effect of reducing fuel waste and pollution caused by engine idling occurring when the vehicle is stopped. Also, since an engine idling sound is not generated when the vehicle is stopped, it may be possible to well listen to the outside sound of the vehicle, thereby effectively preventing safety accidents that occurs due to other vehicles or persons outside the vehicle from occurring.

However, when applying an engine stop rule according to the same existing auto stop system in all situations, a driving state and a stopping state of the engine are repeated in a short cycle in a section in which the vehicle is frequently stopped, such as a vehicle congestion section. In this case, there is a problem that fuel efficiency is worse than the case in which the auto stop system is not applied, and also, driver's fatigue increases.

PRIOR ART DOCUMENT

Patent Document (Patent Document 1) Korean Patent Registration No. 10-1628399

DISCLOSURE OF THE INVENTION

Technical Problem

The present invention is to provide an artificial intelligence apparatus, which predicts a current driving situation on the basis of a driving pattern included in current driving information of the vehicle and controls a control mode for an auto stop system mounted on the vehicle according to the driving situation to prevent the auto stop system from being indiscreetly driven and effectively control the auto stop system, and a method for the same.

Also, the present invention is to provide an artificial intelligence apparatus for controlling an auto stop system, which is capable of controlling the auto stop system that is personalized for each user in consideration of user's feedback on a determined control mode, and a method for the same.

Technical Solution

An embodiment of the present invention provides an artificial intelligence apparatus, which collects driving information indicating a current driving situation of a vehicle, predicts the current driving situation from the collected driving information by using a control model learned by using a driving pattern of a user, determines a control mode for the auto stop system mounted on an adequate vehicle, and controls the auto stop system according to the determined control mode, and a method for the same.

Also, an embodiment of the present invention provides an artificial intelligence apparatus, which uses a control model personalized for each vehicle or user, acquires feedback of a user with respect to a determined control mode to generate training data for updating, which is used to update the control model for the auto stop system, uses the control model for the auto stop system, which is updated using the training data for updating, to determine the control mode for the auto stop system, and controls the auto stop system according to the determined control mode.

Advantageous Effects

According to the various embodiments of the present invention, the control mode for the auto top system may be determined and controlled based on the driving pattern included in the driving information to prevent the auto stop system from being indiscreetly driven, thereby reducing the fatigue of the user, improving the fuel efficiency, and solving the departure delay of the vehicle.

Also, according to the various embodiments of the present invention, the user's satisfaction or preference with respect to the control mode for the auto stop system determined by the control model and determines the control mode by using the control model for the auto stop system that is updated by reflecting the user's satisfaction or preference to control the individualized auto stop system with the high satisfaction for each user.

MODE FOR CARRYING OUT THE INVENTION

Figure 1:
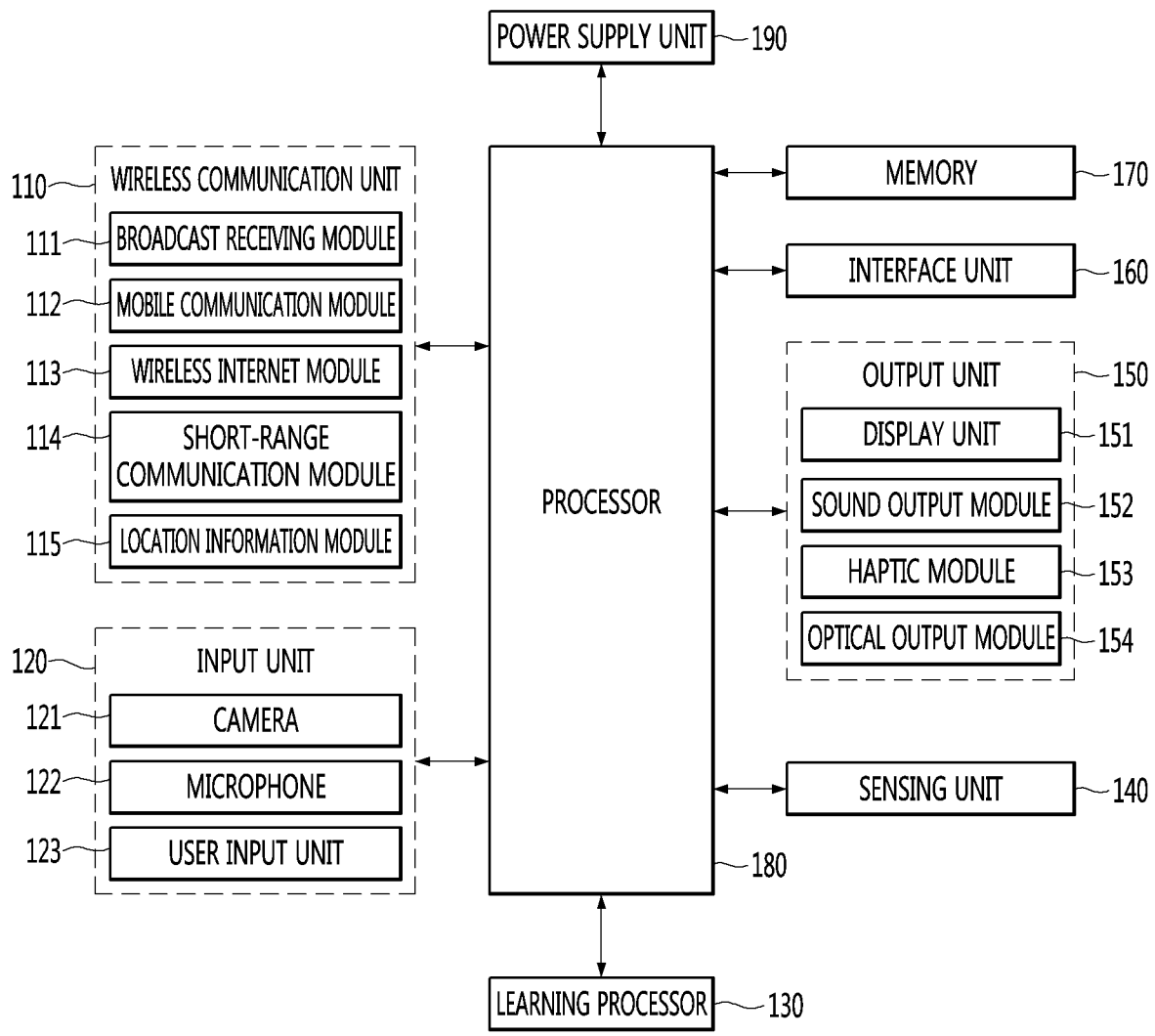
FIG. 1 is a block diagram illustrating a configuration of a control device 100 for an auto stop system according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Hereinafter, the control of the auto stop system may be understood as controlling the auto stop function. Thus, the control device for the auto stop system and the control device for the auto stop function may be commonly used in the same meaning, and the control method for the auto stop system and the control method for the auto stop function may be commonly used in the same meaning.

Also, the control model for the auto stop system and the control model for the auto stop function may be commonly used in the same meaning.

FIG. 1 is a block diagram illustrating a configuration of the control device 100 for the auto stop system according to an embodiment of the present invention.

Hereinafter, the control device 100 for the auto stop system may be called a terminal 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

Particularly, the terminal 100 may be implemented as a navigation and multimedia device mounted on the vehicle. Furthermore, the terminal 100 may be implemented as an apparatus connected to an electronic control unit (ECU) of the vehicle or including an electronic control unit.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
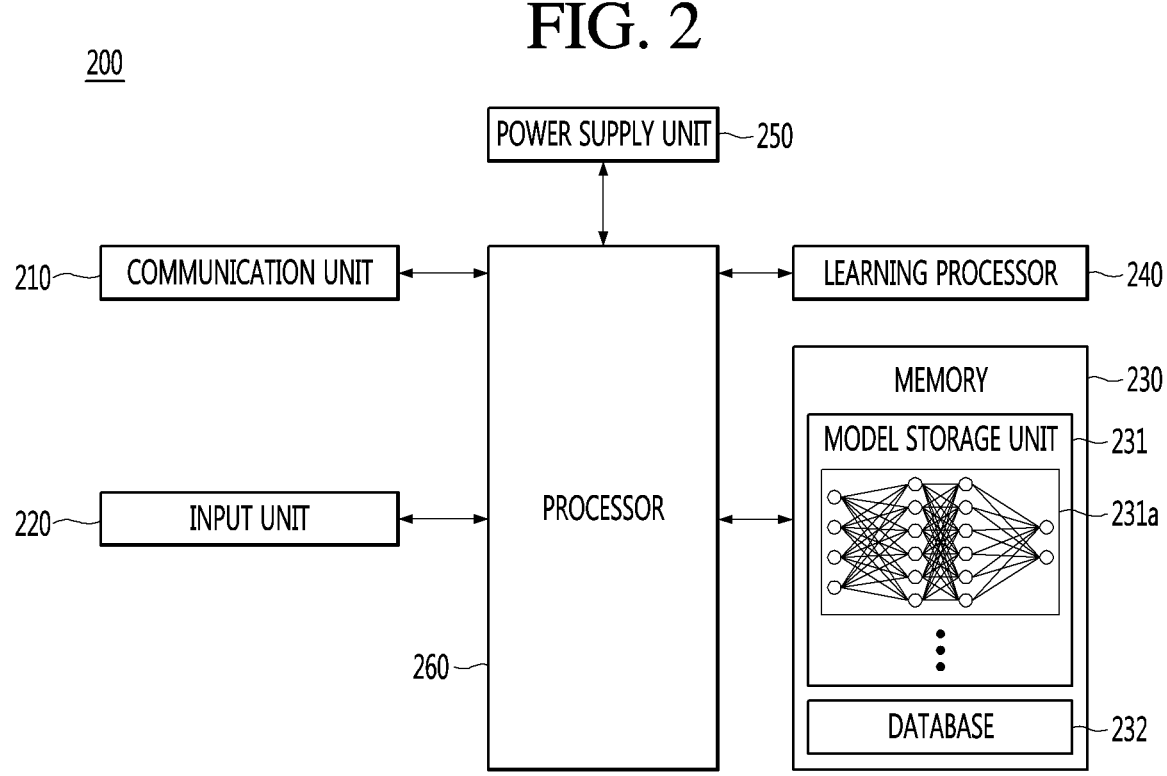
FIG. 2 is a block diagram illustrating a configuration of a learning device 200 of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
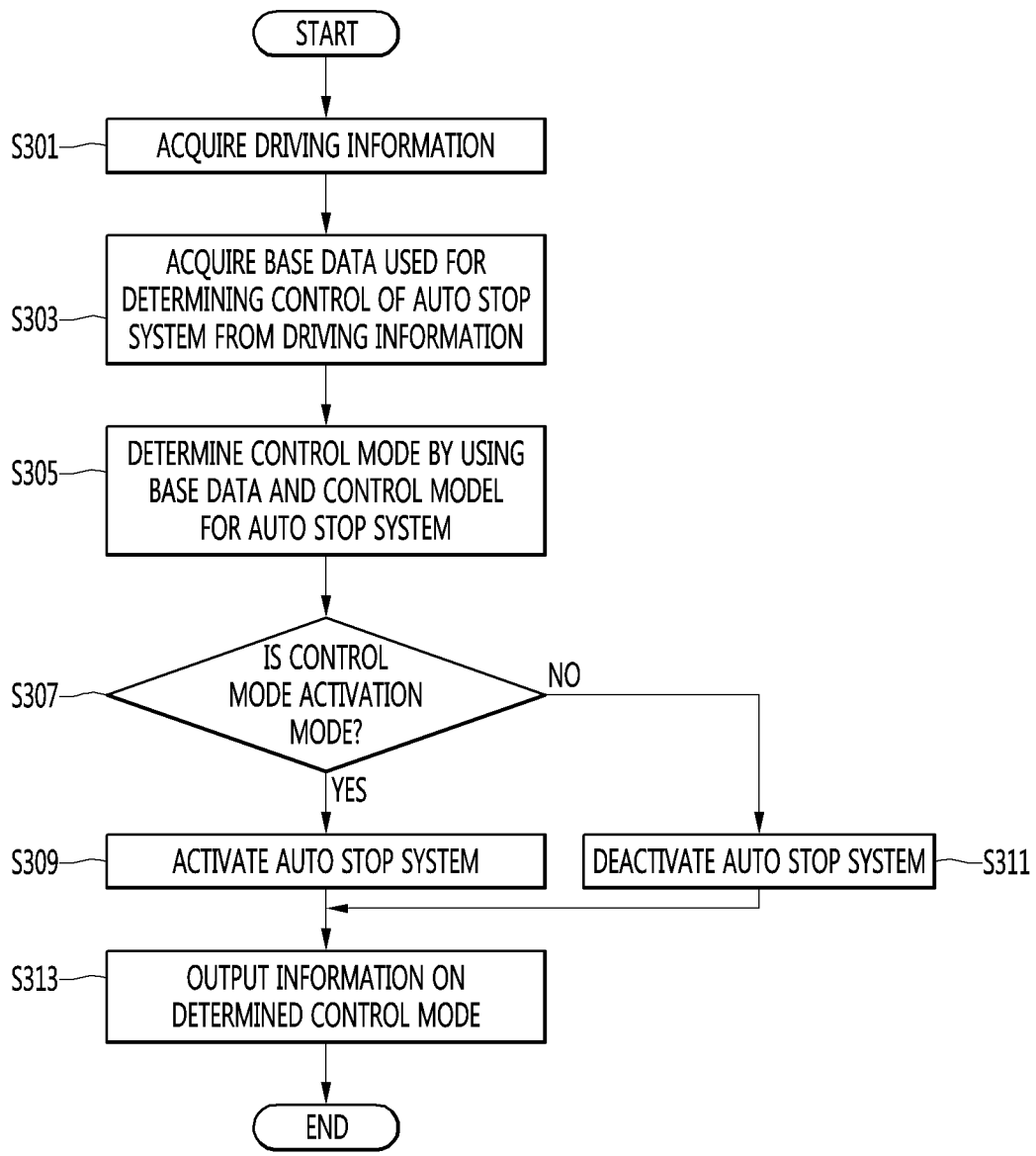
FIG. 3 is a flowchart illustrating a method for controlling an auto stop system according to an embodiment of the present invention.

FIG. 3 is a flowchart illustrating a method for controlling an auto stop system according to an embodiment of the present invention.

Referring to FIG. 3, the processor 180 of the control device 100 for the auto stop system according to an embodiment of the present invention acquires driving information of a vehicle through at least one or more of the input unit 120 or the interface unit 160 (S301).

Hereinafter, when the input unit 120 receives the driving information through the interface unit 160, the input unit 120 may be called as a meaning including the interface unit 160.

Here, the input unit 120 may acquire the driving information from an ECU of the vehicle through the interface unit 160.

Here, the processor 180 may continuously or periodically acquire the driving information of the vehicle.

Here, the driving information may include collected time information (a time stamp). Thus, the driving information of the vehicle include information with respect to a driving pattern.

The processor 180 of the control device 100 for the auto stop system acquires base data used for determining the control of the auto stop system from the driving information (S303).

The base data may be data used for determining whether the auto stop system is activated and also be processed data in the collected driving information. That is, the base data may be preprocessed data in which a value that is not digitized in the driving information according to a predetermined standard, and a numerical value is normalized if necessary and is data that has been preprocessed easily for analysis.

Here, a process of acquiring the base data may mean a process of extracting an input feature vector from the artificial neural network model.

Here, the base data may include an input intensity (or a degree of an input) of the brake pedal corresponding to the break information, the number of inputs of the brake pedal, an input interval of the brake pedal, a degree of change in the input intensity of the brake pedal, an input intensity of the brake pedal at the previous time point, and repeatability of the brake pedal. Also, the base data may include a current velocity, an interval velocity, a velocity transition of the vehicle corresponding to the velocity information of the vehicle, a velocity and deceleration of the vehicle at the previous time point, and the like.

Here, the input intensity of the brake pedal may indicate an input intensity at the present (or at the time point of collecting the driving information), and the input intensity may be expressed numerically to have a value within a predetermined section (for example, 0 to 1) such as a value between 0 and 1.

Figure 5:
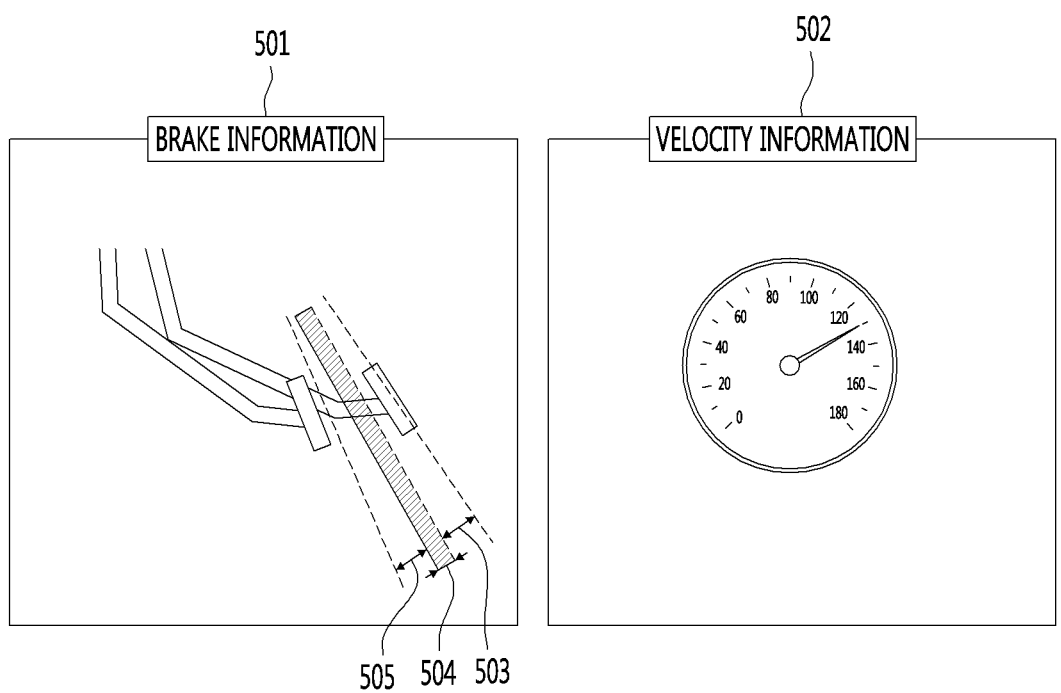
FIG. 5 is a view illustrating an example of the driving information acquired according to an embodiment of the present invention.

Also, as illustrated in FIG. 5, the input intensity of the brake pedal may be further divided into pedal section information 503 indicating whether a pedal clearance section 503, a fine braking section 504, or a rapid braking section 505 corresponds to the input of the brake pedal. This may also be expressed in a predetermined number. For example, the pedal section information may be expressed in numerical values according to a predetermined standard such as 0 for the pedal clearance interval, 0.5 for the fine braking interval, and 1 for the rapid braking interval.

Here, the number of times of inputting of the brake pedal may mean the number of times of inputting of the brake pedal during a predetermined period (for example, 10 seconds).

Here, the input interval of the brake pedal may mean the time interval between the input of the previous brake pedal and the input of the current brake pedal and may be expressed in unit of second.

Here, one input for determining the number of times of inputting and the number of inputs of the brake pedal may represent a period from starting of the input of the brake pedal until ending of the complete input or represent a period during which the input intensity of the brake pedal increases and then continuously decreases.

For example, when it is assumed that the input intensity of the brake pedal is 0 to 1, and the input of the brake pedal increases from 0 to 0.5, then decreases to 0.3, again increases to 0.6, and then decreases to 0; since there is only one section having an input intensity from 0 to 0, it may be determined as one input, and two sections may be determined as two inputs because the input intensity increases and then decreases.

Here, the degree of change of the input intensity of the brake pedal may mean a degree of change of the input intensity in consideration of the input intensity at a predetermined previous time point (for example, before 0.1 second) from the current time point.

Here, the input intensity at the previous time point of the brake pedal may mean an input intensity at a predetermined previous time point (e.g., before 0.1 seconds, etc.). Also, the previous input intensity of the brake pedal may mean an input intensity of a single previous time point as well as an input intensity of a plurality of previous time points (e.g., before 0.1 second, before 0.2 seconds, and before 0.3 seconds).

Here, the current velocity of the vehicle may mean an input intensity at the present (or at a time point of collecting the driving information) and may be expressed in unit of velocity such as km/h.

Here, the section velocity of the vehicle may mean an average velocity of the vehicle during a predetermined time (e.g., 10 seconds) or during a predetermined interval (e.g., 100 meters, etc.) and may be expressed in unit of velocity such as km/h.

Here, the degree of change of the input intensity of the brake pedal may mean a degree of change of the input intensity in consideration of the input intensity at a predetermined previous time point (for example, before 0.1 second) from the current time point.

Here, the velocity of the vehicle at the previous time point may mean a velocity of the vehicle at a predetermined previous time (for example, before 0.1 seconds, etc.), and may be expressed in unit of velocity such as km/h. Also, the velocity of the vehicle at the previous time point may mean an input intensity of a single previous time point as well as an input intensity of a plurality of previous time points (e.g., before 0.1 second, before 0.2 seconds, and before 0.3 seconds).

Here, the base data may include information about each interval or period. For example, the base data may include information indicating that a predetermined period for the number of times of inputting of the brake pedal is 10 seconds, and that the previous time point considered in the degree of change of the input intensity of the brake pedal is before 0.1 second.

Table 1 below shows an example of the base data, and each column represents the base data for independent states.

TABLE 1

|  | Base data 1 | Base data 2 | Base data 3 |
| --- | --- | --- | --- |
| Input intensity of brake pedal | 0.5 | 0.2 | 0.9 |
| Pedal section information | 0.5 (Fine braking section) | 0 (Pedal clearance section) | 1 (Rapid braking section) |
| The number of times of inputting of brake pedal | 3 | 1 | 2 |
| Input interval of brake pedal (s) | 5 | 1 | 10 |
| Input intensity of brake pedal at first previous time point | 0.4 | 0.15 | 0.3 |
| Input intensity of brake pedal at second previous time point | 0.35 | 0.15 | 0 |
| Current velocity (km/h) | 35 | 20 | 60 |
| Section velocity (km/h) | 38 | 23 | 85 |
| Velocity at first previous time point (km/h) | 38 | 22 | 90 |
| Velocity at second previous time point (km/h) | 40 | 24 | 90 |

Table 1 above shows an example of the base data, and the format thereof is only one example. Thus, the format of the base data may be changed according to the embodiment, and the data items included therein may be changed accordingly. For example, the base data may further include first previous time point information indicating when is the first previous time point, and second previous time point information indicating when is the second previous time point.

The processor 180 of the control device for the auto stop system determines a control mode for the auto stop system by using the base data and the control model for the auto stop system (S305).

Here, the control mode may be any one of an activation mode for activating the auto stop function or a deactivation mode for deactivating the auto stop function.

Here, the control model for the auto stop system may mean the artificial neural network-based control model learned by the machine learning algorithm or the deep learning algorithm.

Here, even if the artificial neural network-based control model does not explicitly output the driving pattern which is the driving information, it is learned by reflecting a driving pattern in the learning process. This is done because the above-described base data includes not only an input intensity and velocity of the current brake but also information on an input intensity and velocity of the brake at a predetermined time point, an average input intensity and velocity of the brake, and the like.

Here, the artificial neural network-based control model may be a personalized model that is learned separately for each vehicle or each user.

That is, the artificial neural network-based control model may be learned separately for each vehicle, and the processor 180 may use the artificial neural network-based control model corresponding to the current vehicle. Also, the artificial neural network-based control model may be learned separately for each user, and the processor 180 may use the artificial neural network-based control model corresponding to the current target user.

Here, the artificial neural network-based control model may be stored in the memory 170 of the control device 100 for the auto stop system.

Here, the artificial neural network-based control model stored in the memory 170 may be learned and stored through the learning processor 130 of the control device 100 for the auto stop system and may be stored in the learning processor 240 of the learning device 200 of the artificial neural network and then be received through the wireless communication unit 110 so as to be stored.

Here, the processor 180 may periodically transmit update information of the artificial neural network-based control model to the learning device 200 of the artificial neural network by arrival of a set update time point, a user's request, or a request of the learning device 200 of the artificial neural network. Also, the processor 180 may receive the update information of the artificial neural network-based control model in the learning device 200 of the artificial neural network and store the update information in the storage unit 170 and also may use the updated artificial neural network-based control model to determine the control mode for the auto stop system.

The artificial neural network-based control model may be a model composed of the artificial neural networks that are learned to infer the control mode for an auto stop system as target feature points (or output feature points) by using the training data of the same format as the base data as the input data.

Here, in the training data used for the learning of the artificial neural network-based control model, the control mode for the auto stop system may be labeled so that the artificial neural network-based control model is learned by supervised learning by using the labeled training data.

For example, the training data may include information on the control mode for the auto stop system that is suitable for a given driving situation and a driving situation in the given driving situation, and the artificial neural network-based control model may be learned from the driving information for a given driving environment to accurately infer the control mode of the labeled auto stop system.

In this case, a loss function (cost function) of the artificial neural network-based control model may be expressed as a square mean of a difference between the label of the control mode for the auto stop system corresponding to each training data and the control mode for the auto stop system inferred from each training data. Also, the model parameters included in the artificial neural network may be determined to minimize the cost function through the learning of the artificial neural network-based control model.

That is, the artificial neural network-based control model may be an artificial neural network model that is learned by the supervised learning by using the training data including the driving information for training and the labeled control mode corresponding to the driving information for training, and when the input feature vector is inputted to the artificial neural network-based control model where the input feature vector is extracted from the driving information for learning, the artificial neural network-based control model may output an inferred result with respect to the control mode may be outputted as a target feature vector to minimize a loss function corresponding to a difference between the outputted control mode and the labeled control mode.

Here, the target feature point of the artificial neural network-based control model may be composed of a single node output layer representing the control mode for the auto stop system. The target feature point is set to "1" when the activation mode is indicated and set to "0" when the deactivation mode is indicated. In this case, the output layer of the artificial neural network-based control model may use sigmoid, hyperbolic tangent (tanh), etc. as an activation function.

Here, the target feature point of the artificial neural network-based control model may be composed of an output layer of two output nodes indicating the control mode for the auto stop system, and each output node may indicate whether the output mode is in the activation mode or in the deactivation mode. That is, the target feature point (target feature vector) may be composed of '(whether to be activated or deactivated'), and "(1, 0)" as the value when the target feature point indicates the activation mode, and "(0, 1)" as the value when indicating the deactivation mode. In this case, the output layer of the artificial neural network-based control model may use soft max as an activation function.

Table 2 below shows an example of the training data used for the learning of the artificial neural network-based control model.

TABLE 2

| | Training data 1 | Training data 2 | Training data 3 |
|---|---|---|---|
| Input intensity of brake pedal (0~1) | 0.4 | 0.1 | 1 |
| Pedal section information (0 or 0.5 or 1) | 0.5 (Fine braking section) | 0 (Pedal clearance section) | 1 (Rapid braking section) |
| The number of times of inputting of brake pedal | 2 | 3 | 1 |
| Input interval of brake pedal (s) | 4 | 1 | 15 |
| Input intensity of brake pedal at first previous time point (0~1) | 0.4 | 0.15 | 0.3 |
| Input intensity of brake pedal at second previous time point (0~1) | 0.35 | 0.05 | 0.1 |
| Current velocity (km/h) | 20 | 50 | 60 |
| Section velocity (km/h) | 30 | 60 | 85 |
| Velocity at first previous time point (km/h) | 30 | 60 | 90 |
| Velocity at second previous time point (km/h) | 40 | 60 | 90 |
| Control mode (0 or 1) | 0 | 1 | 1 |

Here, the processor 180 may use the artificial neural network-based control model to acquire the target feature point corresponding to the control mode for the auto stop system by using the base data as the input data and determine the control mode for the auto stop system according to the acquired target feature point.

For example, the processor 180 may input the base data into the learned neural network-based control model and acquire a scalar between 0 and 1 for the control mode or a 2 dimensional vector of which each element is a scalar between 0 and 1 as its output, thereby determining whether to be in the activation mode or the deactivation mode.

Here, the processor 180 may extract the feature vector to use the base data as the input data of the artificial neural network-based control model. However, since the base data acquired in step S303 is a feature vector extracted to be used as the input data of an artificial neural network-based control model in fact, it is not necessary to extract a separate feature vector.

That is, in step S303, the process of representing the non-digitized information by acquiring numerical information when acquiring the base data and normalizing and representing the digitized information may be a feature point extraction process to be used as the input data of the artificial neural network-based control model.

Particularly, the processor 180 may control to deactivate the auto stop system irrespective of the result of the artificial neural network-based control model when the current driving mode of the vehicle is the performance center mode (e.g., sports mode). In this regard, it may be seen that the processor 180 uses both the artificial neural network-based control model and a rule-based control model.

Alternatively, the control mode may be determined so that the auto stop system is deactivated when the current driving mode of the artificial neural network-based control model is the performance center mode. That is, in this point of view, it is possible to determine that the auto stop system is deactivated when the driving mode of the current vehicle is inputted in the control model for the auto stop system control, the driving mode may be the performance center mode in the model.

Examples of the specific artificial neural network-based control model are described with reference to FIGS. 6 to 8.

The processor 180 of the control device 100 of the auto stop system determines whether the determined control mode is the activation mode (S307).

If it is determined in step S307 that the determined control mode is the activation mode, the processor 180 activates the auto stop system (S309).

The activation of the auto stop system means that an engine is stopped when the vehicle is stopped by pressing the brake pedal even if the engine is in a starting state, and the engine operates when the brake pedal is released in the stopped state or when the accelerator pedal is depressed.

Here, if the processor 180 is an electronic control unit of the vehicle, the processor 180 may directly control to activate the auto stop system.

Here, when the processor 180 is configured separately from the electronic control unit of the vehicle, the processor 180 may transmit a control signal for activating the auto stop system to the electronic control unit of the vehicle through the wireless communication unit 110 or the interface unit 160.

If it is determined in step S307 that the determined control mode is the deactivation mode, the processor 180 deactivates the auto stop system (S311).

The fact that the auto stop system is deactivated means that the activity of the auto stop system is restricted in the vehicle equipped with the auto stop system.

Here, if the processor 180 is an electronic control unit of the vehicle, the processor 180 may directly control to deactivate the auto stop system.

Here, when the processor 180 is configured separately from the electronic control unit of the vehicle, the processor 180 may transmit a control signal for deactivating the auto stop system to the electronic control unit of the vehicle through the wireless communication unit 110 or the interface unit 160.

The processor 180 of the control device 100 for the auto stop system outputs information on the determined control mode (S313).

Here, the processor 180 may output information regarding the determined control mode through the output unit 150.

Here, the processor 180 may output information indicating the current control mode or information indicating a change in the control mode through the output unit 150.

For example, the processor 180 may control the display unit 151 to visualize the information indicating the current control mode or the information indicating the change of the control mode to output information as a message or an icon. Also, the processor 180 may control the sound output unit 152 to audibly inform information (current control state information) indicating the current control mode or information indicating a change in the control mode (control state change information). Here, the voice may include a pre-recorded guide voice or a mechanically synthesized voice.

Here, the processor 180 may acquire feedback information for the determined control mode of the user through the input unit 120.

Here, the processor 180 may not only acquire a response that the user has unconsciously determined for the determined control mode as feedback information as well as a case where the user utters the feedback voice for the control mode intentionally determined or presses a feedback button to provide the feedback information.

For example, evaluation information about the control mode inputted through voice such as "the present determined control mode is not satisfied", which is unconsciously uttered for the feedback by the user or a touchable display or button and a voice of the complaint (sigh) or the voice of satisfaction (whoop) which the user unconsciously uttered may be collected as the feedback information.

Here, the collected feedback information may be used to update the artificial neural network-based control model.

Here, the collected feedback information may be used to update only the current personalized artificial neural network-based control model. For example, when updating the artificial neural network-based control model corresponding to the current vehicle or the user, only the feedback information collected from the vehicle or the user may be used.

Here, the collected feedback information may be used as labeling information for the control mode.

Here, the processor 180 may store the feedback information and the base data corresponding to the feedback information in a memory 170 in pairs.

The stored base data and feedback information pair may be used to update the artificial neural network-based control model through the learning processor 130 or the learning processor 240 of the learning device 200 of the artificial neural network.

As described above, since the control mode is determined using the updated control model for the auto stop system by reflecting the user's satisfaction or preference, it is possible to control the individualized auto stop system with high satisfaction for each user.

According to the present invention, the driving situation may be predicted in consideration of the driving pattern from the driving information, and the auto stop system may be controlled adequate for the current driving situation. Thus, this makes it possible to effectively solve the problem that the user's fatigue due to the operation of the auto stop system improperly increases, the fuel consumption is deteriorated, and the delay in departure after the stopping.

Figure 4:
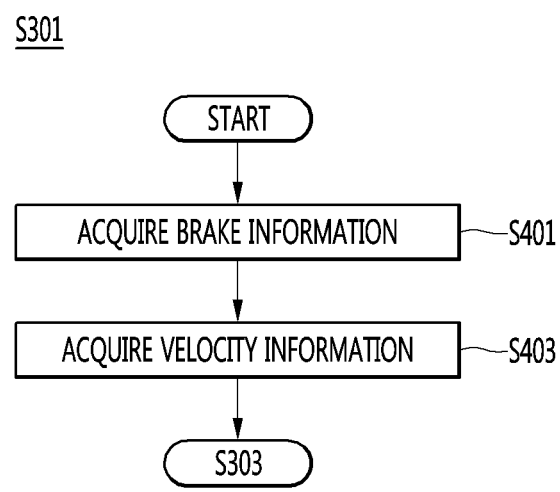
FIG. 4 is a flowchart illustrating an example a step S301 of acquiring driving information illustrated in FIG. 3.

FIG. 4 is a flowchart illustrating an example a step S301 of acquiring driving information of the vehicle illustrated in FIG. 3.

FIG. 5 is a view illustrating an example of the driving information acquired according to an embodiment of the present invention.

Referring to FIGS. 4 and 5, the processor 180 acquires break information 501 through at least one or more of the input unit 120 and the interface unit 160 (S401).

Here, the processor 180 may receive the break information from the electronic control unit of the vehicle.

Here, the brake information may mean an input intensity of the brake pedal collected continuously or periodically. Also, the brake information may include time information (time stamp) with respect to a time when the input intensity of the brake pedal is collected.

Here, the processor 180 may receive the input intensity of the brake pedal in real time as the brake information. Also, the received break information may be stored in the memory 170.

Here, the collected break information includes information on the input intensity of the brake pedal for each time zone and may be used later to acquire the base data.

The processor 180 acquires velocity information 502 through at least one or more of the input unit 120 and the interface unit 160 (S403).

Here, the processor 180 may receive velocity information from the electronic control unit of the vehicle, the navigation device, or the like.

Here, the velocity information may mean a velocity of the vehicle collected continuously or periodically. Also, the velocity information may include time information (time stamp) with respect to a time when the velocity of the vehicle is collected.

Here, the processor 180 may receive the velocity of the vehicle in real time as the velocity information. Also, the received velocity information may be stored in the memory 170.

Here, the collected velocity information includes information on the velocity of the vehicle for each time zone and may be used later to acquire the base data.

In an alternative embodiment, steps S401 and S403 for acquiring the driving information may be performed in parallel with each other or may be performed in a different order.

Figure 6:
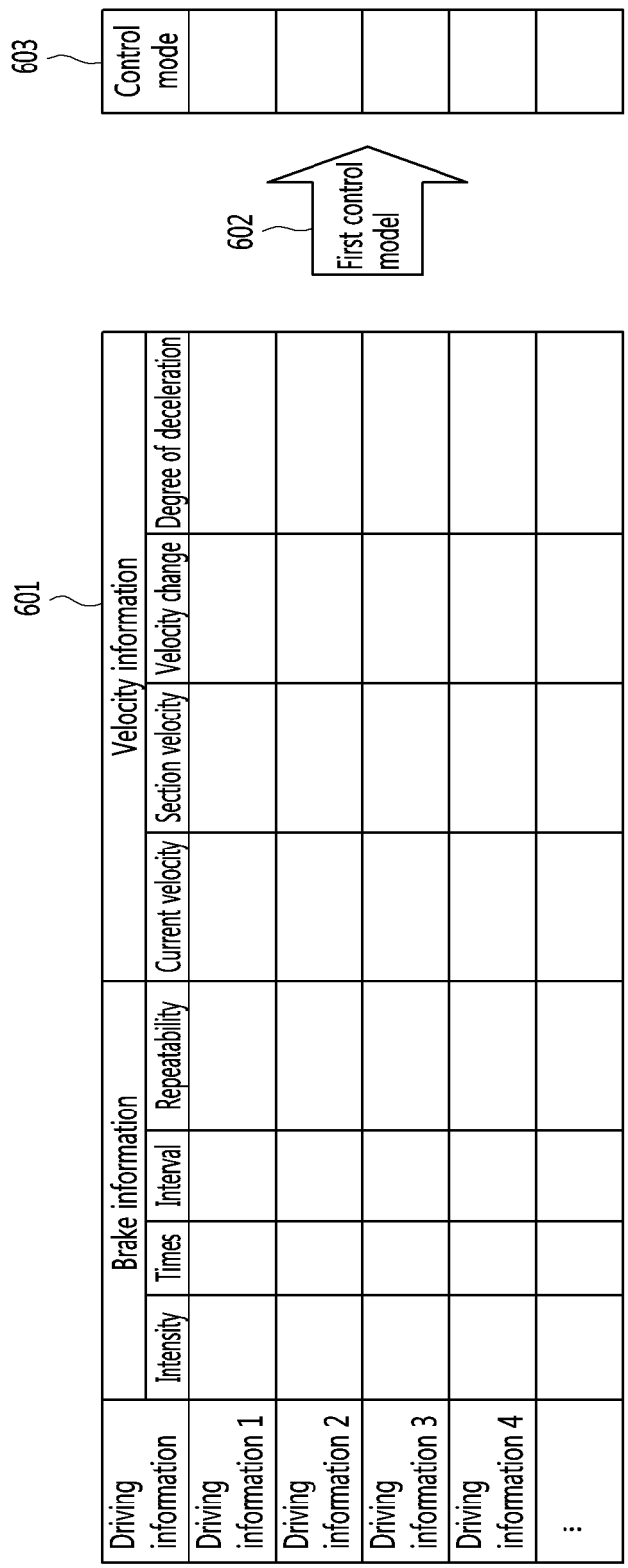
FIGS. 6 to 8 are views illustrating examples of control models according to an embodiment of the present invention.
Figure 7:
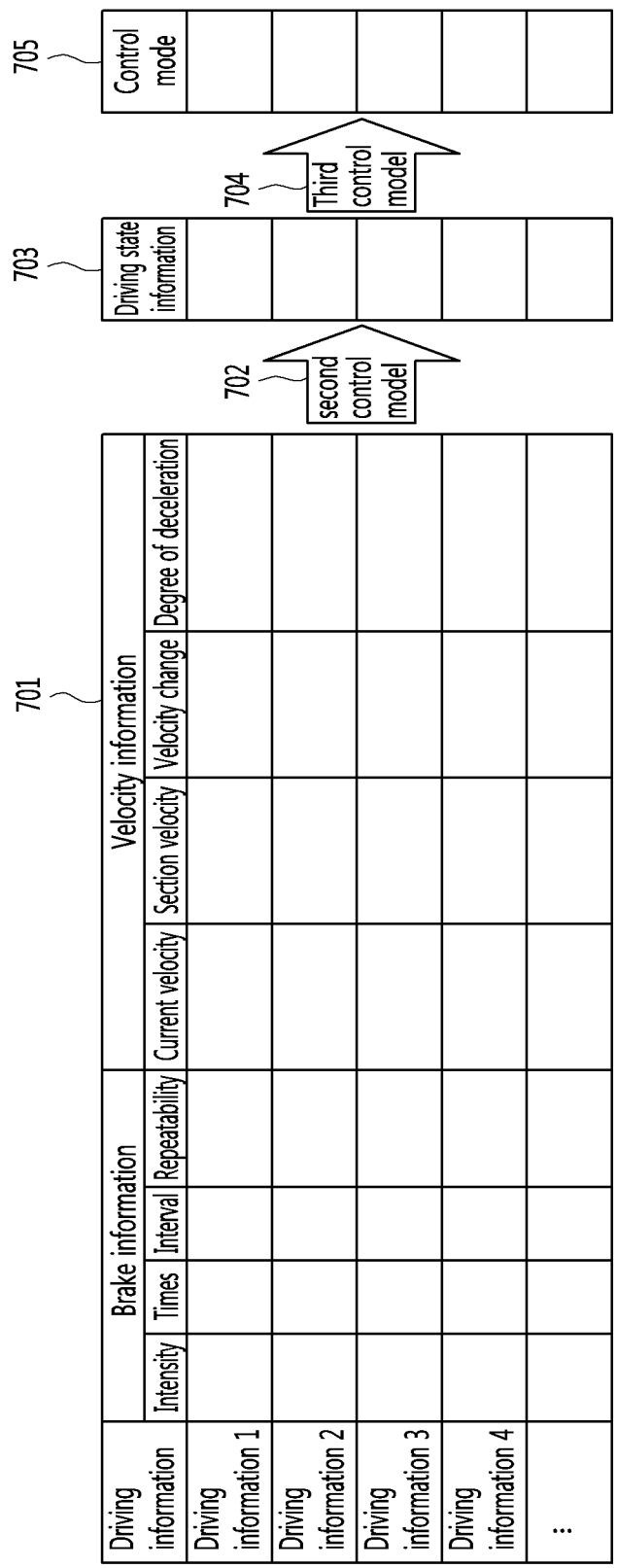
Figure 8:
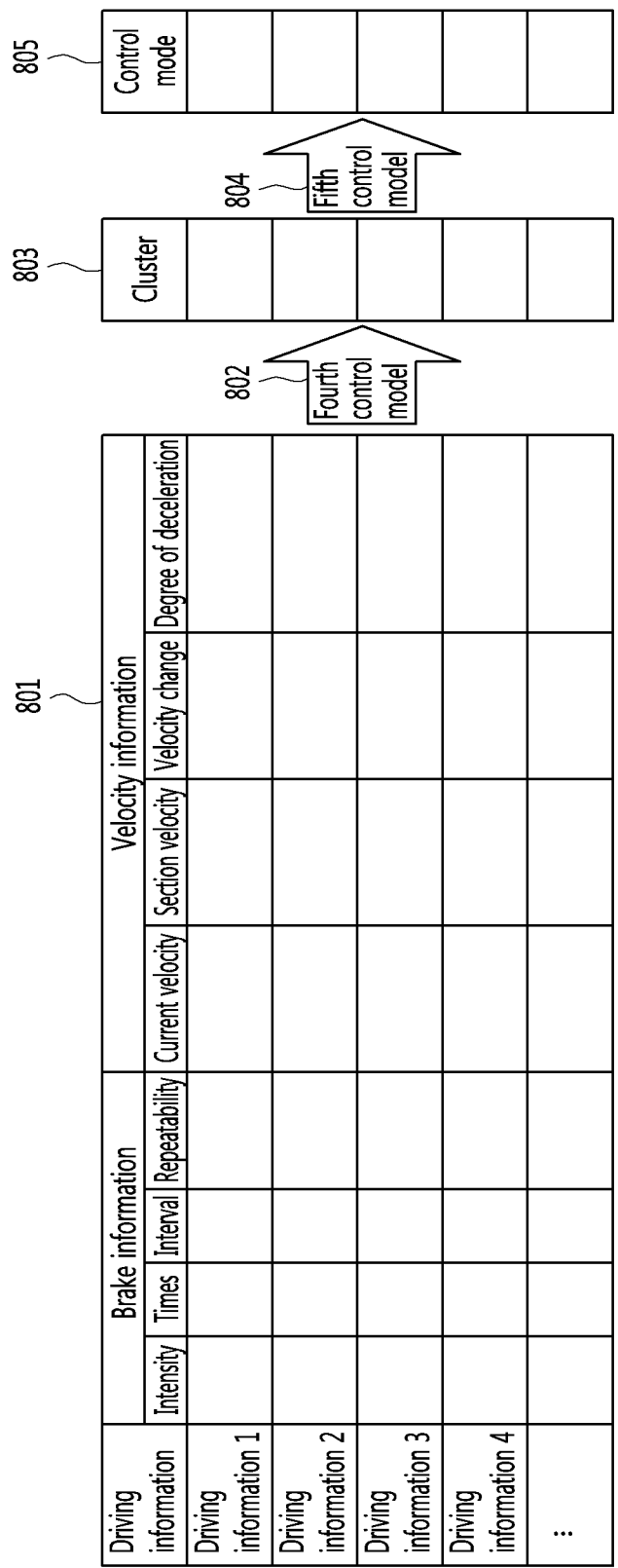

FIGS. 6 to 8 are views illustrating examples of control models according to an embodiment of the present invention.

Referring to FIG. 6, the control model for the auto stop system according to an embodiment of the present invention may be a first artificial neural network-based control model 602 (a first model), which is learned by using first training data including driving information for learning and a labeled control mode corresponding thereto.

The first training data may include driving information corresponding to a specific driving situation and a control mode that is suitable for the driving situation. The first control model 602 may determine the control mode 603 when the driving information 601 is inputted.

The first model may determine the control mode by learning the driving pattern of the user (an operation pattern of the brake pedal and the vehicle velocity pattern) and predicting a time from the driving information of the current user to the restarting time after being stopped. In the first model, when the vehicle is driven at a medium velocity or high velocity as in the case where the user is stopped due to a traffic signal while the vehicle is slowly stopping by braking slowly, it may be determined that it takes a long time until restarting, and thus, the control mode may be determined to be activated. On the other hand, in the first model, when the vehicle is driven at a low velocity as in a stagnant situation and repeats the stop, it may be determined that it takes a short time until restarting, and thus, the control mode may be determined to deactivate the auto stop function.

Here, when the driving information 601 is inputted to the first control model 602, the input feature vector or input feature point may be extracted, which means the acquiring of the above-described base data. Thus, the input of the driving information 601 to the first control model 602 may mean that the above-described base data is inputted.

Referring to FIG. 7, the control model for the auto stop system according to an embodiment of the present invention may include a second model 702 for inferring driving state information 703 from driving information 701 and a third model 704 for inferring a control mode 705 from the driving state information 703.

Here, the second model 703 may be a model that is learned by supervised learning by using second training data including driving information for training and a labeled control mode corresponding to the driving information for training, and when a second input feature vector is inputted to the second model where the second input feature vector is extracted from the driving information for training, the second model may output an inferred result with respect to the driving state information as a second target feature vector, and the second model may be learned to minimize a loss function corresponding to a difference between the outputted driving state information and the labeled driving state information.

Here, the third model 705 may be a model that is learned by supervised learning by using third training data comprising driving state information for training and a labeled control mode corresponding to the driving state information for training, and when a third input feature vector is inputted to the third model where the third input feature vector extracted from the driving state information for training, the third model may output an inferred result with respect to the control mode as a third target feature vector, and the third model may be learned to minimize a loss function corresponding to a difference between the outputted control mode and the labeled control mode.

Here, the driving state information may mean information indicating the driving state of the current vehicle.

For example, the driving state information may indicate one of: i) a normal driving state, ii) a regularly stopped state by a signal, iii) a sudden stop and a scheduled departure state, and iv) a traffic jam state.

That is, the second training data may include driving information corresponding to a specific driving situation and driving state information indicating the driving situation. The third training data may include driving state information indicating a specific driving situation and a control mode suitable for the driving situation. Also, the second control model 702 may infer the driving state information 703 when the driving information 701 is inputted, and the third control model 704 may infer the driving state information 703 when the inferred driving state information 703 is inputted.

For example, the second model may determine the current driving state as a periodic stop state based on the signal when the user drives the vehicle at a medium or high velocity and then slowly stops by braking slowly. On the other hand, in the second model, when the vehicle is driven at a low velocity and then stopped, the current driving state may be determined as a traffic jam state.

For example, the third model may determine the control mode to activate the auto stop function when the current driving state is the periodic stop state by the signal and may determine the control mode to deactivate the auto stop function when the current driving state is the traffic jam state. However, this is merely an example, and the results may vary depending on the learning by training data given in advance or the learning by the user feedback. If the user gives feedback to disable the auto stop function even if it is determined as the regular stop state by the signal, then the third model may be learned to determine the control mode so as to disable the auto stop function even in the periodical stop state by the signal.

When the driving information 701 is input to the second control model 702, an input feature vector or input feature point is extracted, and this may mean acquiring of the above-described base data. Thus, the input of the driving information 701 to the second control model 702 may mean that the above-described base data is inputted.

Referring to FIG. 8, the control model for the auto stop system according to an embodiment of the present invention may include a fourth model 802 for classifying the driving information 801 into one of a plurality of clusters 803 corresponding to the driving state and a fifth model that infer the control mode 805 from each of the clusters 803.

Here, the fourth model 803 may be a model that is learned by unsupervised learning to perform the clustering by using fourth training data, and when a fourth input feature vector is inputted to the fourth model where the fourth input feature is extracted from the driving information for training, the fourth model may output the inferred result with respect to the belonging cluster of the plurality of clusters as a fourth target feature vector Here, the fifth model 805 may be a model that is learned by supervised learning by using fifth training data comprising each of the plurality of clusters and a labeled control mode corresponding to each of the plurality of clusters, and when a fifth input feature vector is inputted to the fifth model where the fifth input feature vector is extracted from each of the plurality of clusters, the fifth model may output the inferred result with respect to the control mode as a fifth target feature vector, and the fifth model may be learned to minimize a loss function corresponding to a difference between the outputted control mode and the labeled control mode.

That is, the fourth training data may include driving information corresponding to a specific driving situation, and the fourth control model 802 may classify the driving information 801 into one of the plurality of clusters 803 corresponding to the driving state information when the driving information 801 is inputted. Also, the fifth training data may include information indicating each cluster corresponding to the driving situation and a control mode that is suitable for the driving situation. Also, the fifth control model 804 may infer the control mode 805 when information about the classified clusters 803 are inputted.

Here, when the driving information 801 is inputted to the fourth control model 802, an input feature vector or input feature point may be extracted, and this may mean acquiring of the above-described base data. Thus, the input of the driving information 801 to the fourth control model 802 may mean that the above-described base data is inputted.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

The above-described AI apparatus is not applied to be limited to the configuration and method of the above-described embodiments and may be configured by selectively combining all or some of the embodiments so that the embodiments are variously modified.

What is claimed is:

1. An artificial intelligence apparatus for controlling an auto stop function, comprising:
an input configured to receive brake information and velocity information of a vehicle;
a storage configured to store a control model for the auto stop function; and
a processor configured to:
acquire driving information comprising the brake information and the velocity information through the input,
acquire base data used for determining a control of the auto stop function from the driving information,
determine a control mode for the auto stop function by using the base data and the control model for the auto stop function, wherein the control model for the auto stop function is trained through an external learning device for an artificial neural network or a learning processor that performs training of the artificial neural network, and the control model for the auto stop function is a personalization model that is trained separately for each vehicle or for each user, and
control the auto stop function according to the determined control mode, wherein the control mode is one of an activation mode which activates the auto stop function or a deactivation mode which deactivates the auto stop function.

2. The artificial intelligence apparatus according to claim 1, wherein the artificial neural network is trained by using a machine learning algorithm or a deep learning algorithm.

3. The artificial intelligence apparatus according to claim 2, wherein the control model for the auto stop function is a first model that is trained by supervised learning by using first training data comprising driving information for training and a labeled control mode corresponding to the driving information for training, and
when a first input feature vector is inputted to the control model for the auto stop function where the first input feature vector is extracted from the driving information for training, the control model for the auto stop function outputs an inferred result with respect to the control mode as a first target feature vector, and
the control model for the auto stop function is trained to minimize a loss function corresponding to a difference between the outputted control mode and the labeled control mode.

4. The artificial intelligence apparatus according to claim 3, wherein the processor is further configured to:
acquire feedback from a user with respect to the control of the auto stop function through the input,
generate training data for updating the acquired feedback and driving information at a time point at which the feedback is acquired, and
store the training data for updating in the storage or transmitting the training data for updating to the external learning device.

5. The artificial intelligence apparatus according to claim 4, wherein the control model for the auto stop function is trained by additionally reflecting the training data for updating.

6. The artificial intelligence apparatus according to claim 2, wherein the control model for the auto stop function comprises:
a second model configured to determine driving state information from the driving information; and
a third model configured to determine the control mode from the driving state information,
wherein the second model is a model that is trained by supervised learning by using second training data comprising driving information for training and a labeled control mode corresponding to the driving information for training, and when a second input feature vector is inputted to the second model where the second input feature vector is extracted from the driving information for training, the second model outputs an inferred result with respect to the driving state information as a second target feature vector, and the second model is trained to minimize a loss function corresponding to a difference between the outputted driving state information and the labeled driving state information, wherein the third model is a model that is trained by supervised learning by using third training data comprising driving state information for training and a labeled control mode corresponding to the driving state information for training, and when a third input feature vector is inputted to the third model where the third input feature vector extracted from the driving state information for training, the third model outputs an inferred result with respect to the control mode as a third target feature vector, and the third model is trained to minimize a loss function corresponding to a difference between the outputted control mode and the labeled control mode.

7. The artificial intelligence apparatus according to claim 2, wherein the control model for the auto stop function comprises:

a fourth model configured to classify the driving information as one of a plurality of clusters corresponding to a driving state; and a fifth model configured to determine the control mode from each of the clusters, wherein the fourth model is a model that is trained by unsupervised learning to perform the clustering by using fourth training data, and when a fourth input feature vector is inputted to the fourth model where the fourth input feature is extracted from the driving information for training, the fourth model outputs an inferred result with respect to a belonging cluster of the plurality of clusters as a fourth target feature vector, wherein the fifth model is a model that is trained by supervised learning by using fifth training data comprising each of the plurality of clusters and a labeled control mode corresponding to each of the plurality of clusters, and when a fifth input feature vector is inputted to the fifth model where the fifth input feature vector is extracted from each of the plurality of clusters, the fifth model outputs an inferred result with respect to the control mode as a fifth target feature vector, and the fifth model is trained to minimize a loss function corresponding to a difference between the outputted control mode and the labeled control mode.

8. The artificial intelligence apparatus according to claim 2, wherein, based on the artificial neural network-based control model being trained from the external learning device, the processor is further configured to:

receive update information for the artificial neural network-based control model to the learning device from the external learning device by requesting the update information, when request from a user is received, a set update time point is arrived, or an update notification is received from the external learning device, and update the artificial neural network-based control model by using the received update information.

9. The artificial intelligence apparatus according to claim 1, wherein the processor is further configured to:

change information of the driving information that is not represented numerically into a numerical value according to preset corresponding information, and normalize a value, which is capable of being normalized, of the information represented as the numerical value so as to be expressed as a real number between 0 and 1, thereby acquiring the base data.

10. The artificial intelligence apparatus according to claim 1, wherein the control model for the auto stop function is a model configured to determine the control mode as the deactivation mode when the driving mode of the vehicle is a performance-based mode.

11. The artificial intelligence apparatus according to claim 1, further comprising an output comprising at least one or more of a display or a speaker, wherein the processor is further configured to cause an output of at least one or more of current control state information of the auto stop function or changed information in the control state of the auto stop function according to the determined control mode.

12. The artificial intelligence apparatus according to claim 1, wherein the base data comprises:

at least one or more of an input intensity of a brake pedal, a number of inputs of the brake pedal, an input interval of the brake pedal, a degree of change of the input intensity of the brake pedal, an input intensity of the brake pedal at a previous time point, or repeatability of the brake pedal, which correspond to the brake information, and at least one or more of a current velocity, an interval velocity, a velocity change, a velocity at the previous time point, or a degree of deceleration, which correspond to the velocity information.

13. A control method for controlling an auto stop function, comprising:

acquiring, via a processor, driving information comprising brake information and velocity information through an input unit receiving the brake information and the velocity information;

acquiring, via the processor, base data used for determining a control of the auto stop function from the driving information;

determining, via the processor, a control mode for the auto stop function by using the base data and a control model for the auto stop function; and controlling, via the processor, the auto stop function according to the determined control mode, wherein the control mode is one of an activation mode which activates the auto stop function or a deactivation mode which deactivates the auto stop function, wherein the control model for the auto stop function is trained through an external learning device for an artificial neural network or a learning processor that performs training of the artificial neural network, and the control model for the auto stop function is a personalization model that is trained separately for each vehicle or for each user.

14. A non-transitory computer-readable recording medium in which a computer program for performing a control method for controlling an auto stop function is recorded, wherein the control method comprises:

acquiring, via a processor, driving information comprising brake information and velocity information through an input unit receiving the brake information and the velocity information;

acquiring, via the processor, base data used for determining a control of the auto stop function from the driving information;

determining, via the processor, a control mode for the auto stop function by using the base data and a control model for the auto stop function; and controlling, via the processor, the auto stop function according to the determined control mode, wherein the control mode is one of an activation mode which activates the auto stop function or a deactivation mode which deactivates the auto stop function, wherein the control model for the auto stop function is trained through an external learning device for an artificial neural network or a learning processor that performs training of the artificial neural network, and the control model for the auto stop function is a personalization model that is trained separately for each vehicle or for each user.

* * * * *